United States Patent [19]

Everett

[11] 4,376,356
[45] Mar. 15, 1983

[54] CUT-OFF SAWS

[76] Inventor: Charles T. Everett, 308 Country Club Dr., Warren, Ohio 44483

[21] Appl. No.: 121,784

[22] Filed: Feb. 15, 1980

[51] Int. Cl.³ .................................... B24B 51/00
[52] U.S. Cl. ............................... 51/98 R; 51/99; 51/233; 125/13 R
[58] Field of Search ............ 125/135 S, 13 R; 51/98 R, 99, 233, 165.86

[56] References Cited

U.S. PATENT DOCUMENTS

| | | | |
|---|---|---|---|
| 2,116,186 | 4/1938 | Vuilleumier | 51/165.86 |
| 2,706,467 | 4/1955 | Houldsworth | 51/233 |
| 2,763,967 | 9/1956 | Hardy | 51/98 R |
| 2,836,015 | 5/1958 | Stone | 51/98 R |
| 3,656,261 | 4/1972 | Everett | 51/99 |

Primary Examiner—Harold D. Whitehead
Attorney, Agent, or Firm—Michael Williams

[57] ABSTRACT

My invention is particularly adapted for metal saws having disc-like cutters, and especially abrasive disc saws, wherein the saw is fixed to a shaft which is rotatable within a bearing located at one end of a rocker arm. A drive motor, preferably an electric motor, is mounted on the other end of the arm and the latter is pivoted intermediate the saw and the motor on a bracket extending upwardly from a base. The arm swings about the pivot to move the saw toward and away from the work to be cut, which work is clamped within a vise secured to the upper surface of the base. The improvement herein disclosed comprises means for adjusting the amount the saw moves in directions toward and away from the work so that the saw does not "cut air"; that is so that the saw is halted in its up position just slightly above the work, and in its down position just slightly below the work. The saw is activated through a cycle wherein it moves down to engage and cut through the work and then automatically raise to, and remain in, its upper position, ready for the next cutting cycle after the work has been moved longitudinally and again clamped.

1 Claim, 11 Drawing Figures

CUT-OFF SAWS

BACKGROUND AND SUMMARY

U.S. Pat. No. 3,656,261 issued to me on Apr. 18, 1972, shows a cutting device control wherein the downward movement of a rapidly rotating abrasive cutoff disc is controlled to a point wherein it has just cut through the work, whereupon the saw is thereafter moved to its up position. In this patent the up position was always the same and, as the disc wore and its diameter became less, more and more time was lost in bringing the saw down to contact with the work. The control device disclosed in said patent was of an electronic nature which required control meter relays and such devices have had considerable commercial success.

My present invention provides a control for both up and down limits of the cutter disc by inexpensive and reliable mechanical components which are readily adjustable to operate limit switches at precisely set times. Thus, the swinging movement of the oscillatable arm that rotatably carries the cutting disc is limited to exactly the amount of slight clearance between the work and slight clearance after the work has been cut. Limit of the amount of arm swinging saves valuable production time and therefore enhances the utility of the cutoff machine as a whole.

DESCRIPTION OF THE DRAWINGS

In the drawings accompanying this specification and forming a part of this application, there is shown, for purpose of illustration, an embodiment which my invention may assume, and in these drawings.

DISCLOSURE OF PREFERRED EMBODIMENT

Figure 1:
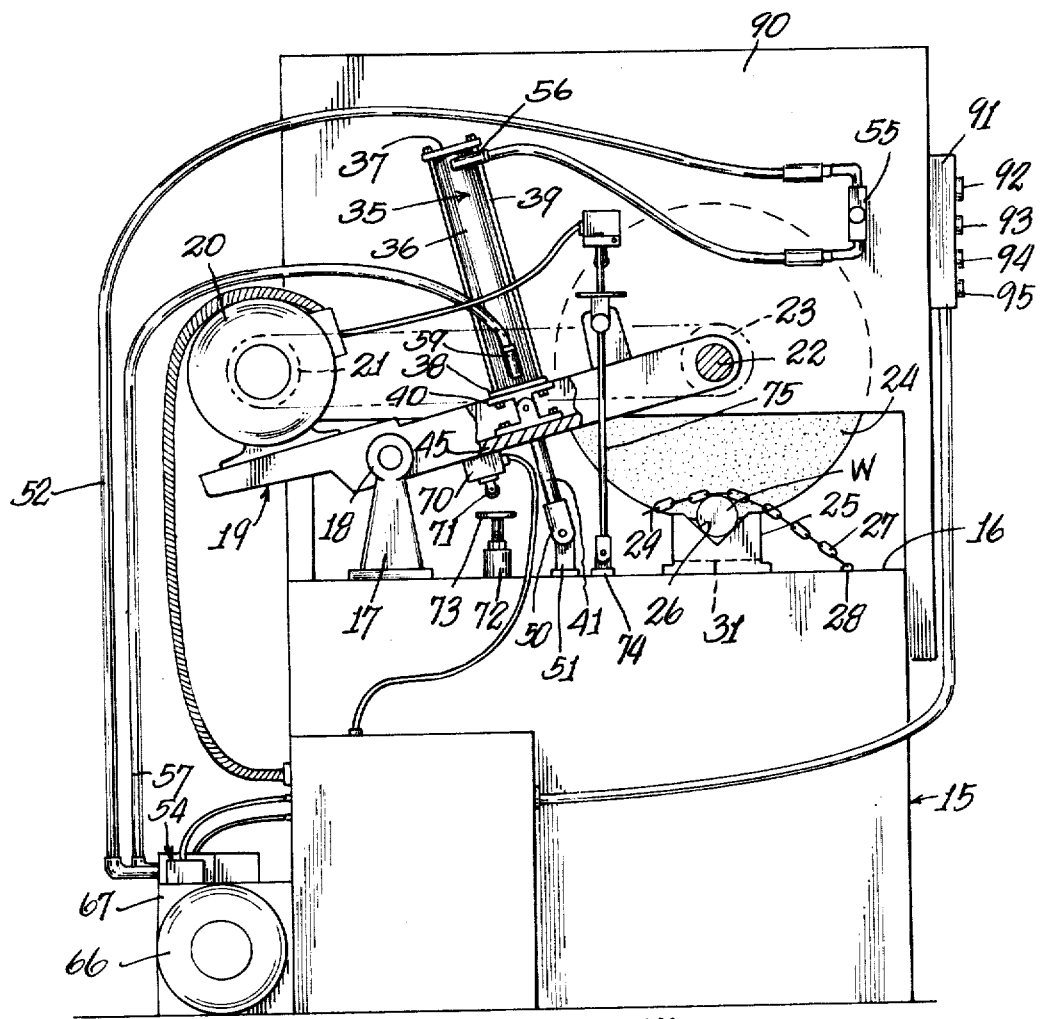
FIG. 1 is a side elevational view of a cutoff machine embodying my invention.

The machine herein disclosed comprises a fabricated housing 15 providing a horizontally-disposed support surface 16. A bracket 17 is secured to the surface 16 and extends upwardly therefrom and provides a pair of spaced ears 18 between which an intermediate portion of a beam-like rocker arm 19 is pivoted for vertical swinging movement.

Mounted on a shorter portion of the arm is an electric motor 20 having a pulley 21 fixed to its shaft. The opposite end of the arm 19 provides an elongated opening in which a horizontally extending shaft 22 is journalled, but held against any substantial movement in an axial direction. A pulley 23 is mounted on one end of the shaft 22 in line with the pulley 21 on the shaft of the motor 20, and a belt is trained over the pulleys 21 and 23 to drive the shaft 22. A circular cutoff disc 24 is secured to the opposite end of the shaft 22 and, in the preferred embodiment, the disc is an abrasive cutoff disc.

Figure 3:
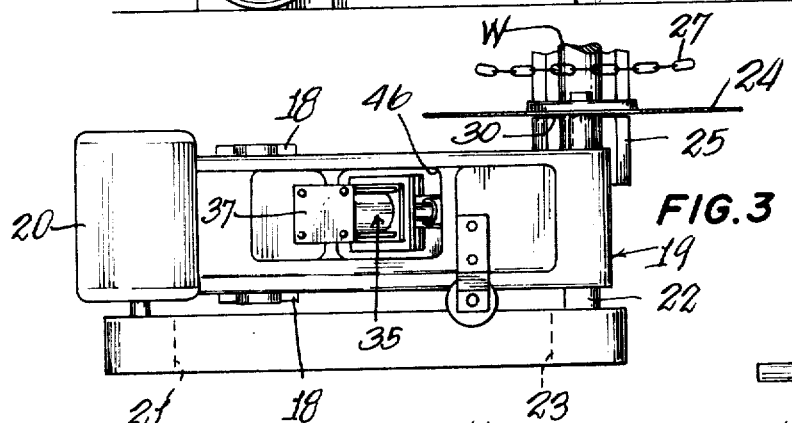
FIG. 3 is a fragmentary top plan view of the machine shown in FIG. 1.
Figure 5:
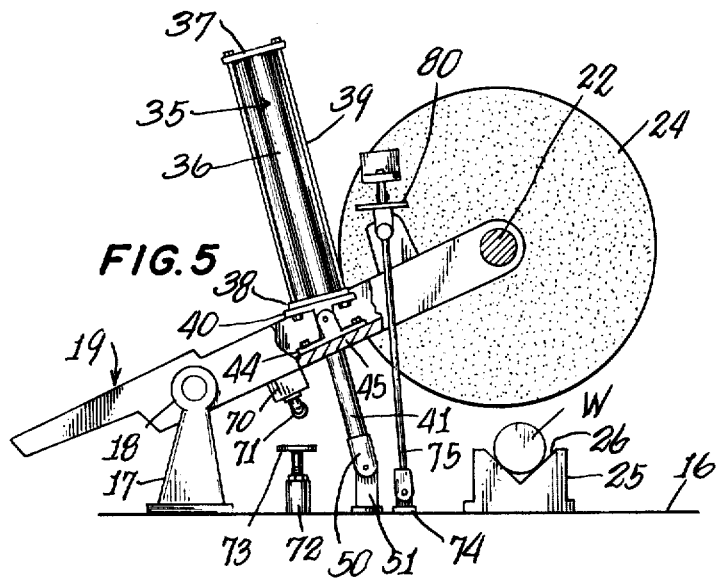
FIG. 5 is a fragmentary side view showing the position of parts in the "up" position of the saw.
Figure 6:
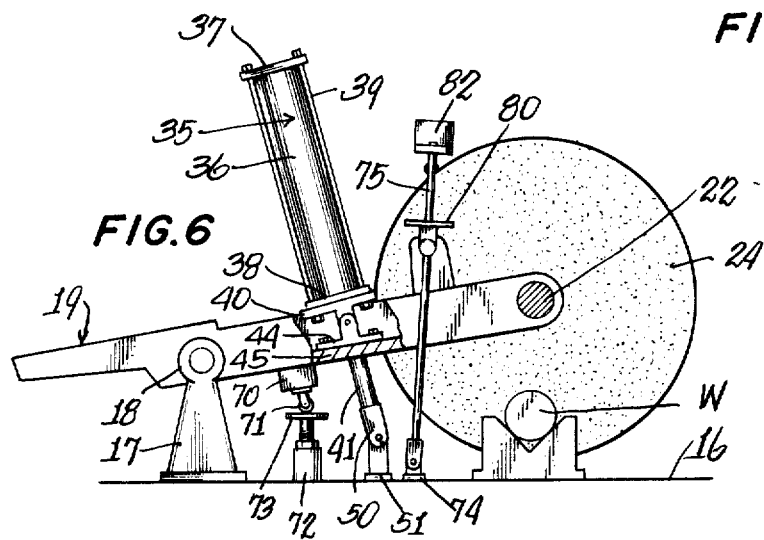
FIG. 6 is a fragmentary side view similar to FIG. 5 but showing the portion of parts in the "down" position of the saw.

A work-holding vise 25 is fixed to the surface 16 and extends upwardly therefrom. The vise may take any desired form and, for use with an abrasive cutoff disc, may have a V-opening 26 in which the work W is cradled. Normally, a chain 27 extends over the work to hold it in position for the cutting operation. One end 28 of the chain is anchored to the surface 16, as seen in FIG. 1. The opposite end 29 is connected to the operating rod (not shown) of a fluid cylinder. When fluid is admitted to the rod end of the cylinder, the rod is drawn within the cylinder and tightens the chain on the work. The vise has a slot 30 (see FIG. 3) to pass the abrasive cutoff disc an amount just short of the bottom wall 31 of the vise. The vise to hold the work, and the chain and cylinder for clamping the work, are well-known in the art. The construction heretofore described is largely conventional and has been described to set the stage for disclosure of my invention. As seen in FIGS. 5 and 6, the abrasive cutoff disc 24 is swingable between an "up" position (FIG. 5) and a "down" position (FIG. 6).

Heretofore the rocker arm 19 supporting the abrasive cutoff disc 24 was shifted by hand or, if there were any power assist, no provision was made to adjust the swinging distance of the arm to a bare minimum, and valuable production time was lost in what the industry calls "cutting air"; that is when the "up" position of the abrasive disc disposed the latter a considerable distance above the work, and the disc had to travel through air a considerable amount before its periphery contacted the work.

Through use of my invention the swinging movement of the rocker arm 19, and the disc 24 supported thereby, is adjustable so that in the "up" position the periphery of the disc is just slightly above the work, and in the "down" position the periphery of the disc has just cut through the work but is held short of contacting the bottom wall 31 of the vise.

As seen in the various drawing figures, a fluid cylinder 35 provides the power for shifting the rocker arm 19, the cylinder comprising a metal sleeve 36 in which the usual piston (not shown) is adapted to reciprocate. The opposite ends of the sleeve are closed by heads 37 and 38, with tie bolts 39 extending between the heads. The cylinder 35 differs from conventional design only in that a plate 40 is held against the lower head 38 by the tie bolts 39. The piston rod 41 extends outwardly of the sleeve through an opening in the lower head and this lower head has packing to prevent fluid loss through the opening in such head.

Figure 9:
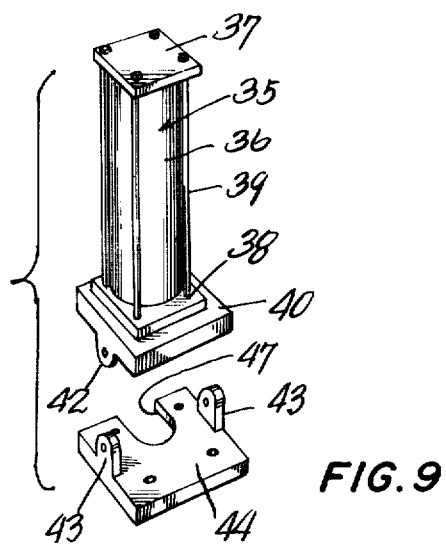
FIG. 9 is a separated perspective view showing the fluid cylinder and its holddown bracket.

As best seen in FIG. 9, the plate 40 has a pair of apertured ears 42 extending downwardly therefrom (only one ear is visible), the ears 42 being pivotally connected to complementary ears 43 extending upwardly from a supporting plate 44. The plate 44 is bolted to a crosswall 45 of the rocker arm 19, this wall having a slot 46 (see FIG. 3) to pass the piston rod 41. The plate 44 is also formed with a slot 47 (see FIG. 9) to pass the piston rod. The piston rod has a lower bifurcated end 50 (see FIG. 1) which is pivotally connected to a bracket 51 connected to and extending upwardly from the support surface 16.

A fluid line 52 (see FIGS. 1 and 4a) extends from communication with one outlet port 53 of a solenoid actuated control valve 54, a manually-adjustable flow control valve 55 being interposed in the line 52 prior to the latter's connection to the upper port 56 of the cylinder 35. Another fluid line 57 extends from communication with another outlet port 58 of the valve 54 and is connected to the lower port 59 of the cylinder. The valve 54 also has a pressure inlet port 60 and a fluid return port 61.

Figure 4A:
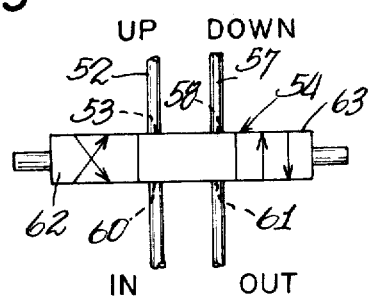
FIG. 4a is a schematic view of a solenoid control valve.

Solenoids 62 and 63 are at opposite ends of the valve, one to shift the valve spool (not shown) in one direction and the other to shift the valve spool in the opposite direction. The valve 54 is of any commercially available type wherein the spool will shift to a central position to block flow of fluid to any of its ports when both solenoids 62 and 63 are deenergized. FIG. 4a, by means of arrows in conventional manner, shows fluid flow and control in the valve.

Figure 4:
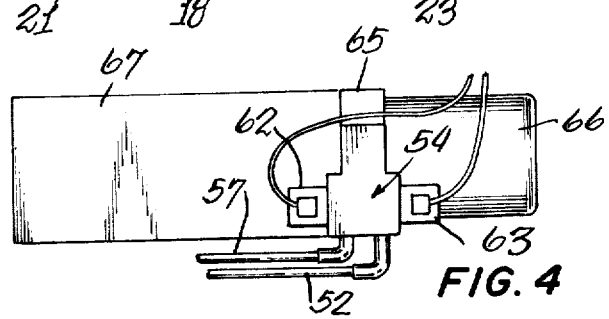
FIG. 4 is a fragmentary top plan view of the hydraulic portion of the machine.

The pressure inlet port 60 of the valve is connected to a source of fluid under pressure, such as a pump (see FIG. 4) driven by an electric motor 66. The return port 61 of the valve is connected to a reservoir 67 in accordance with conventional practice. When the coil of the solenoid 62 is energized, the valve spool is shifted to connect inlet port 60 to outlet port 58 of the valve and this directs fluid under pressure through the fluid line 57 to the lower port 59 of the cylinder. Since the cylinder rod is held against axial movement by reason of its connection with the bracket 50, the piston is held stationary while the sleeve 36 of the cylinder moves. Therefore, the sleeve 36 is driven downwardly to in turn swing the rocker arm 19 so that abrasive cutoff disc moves downwardly. In this position of the valve spool, fluid from above the piston is forced outwardly of the upper port of the cylinder and through the flow line 52 to the reservoir 67. If the coil of the solenoid 62 is deenergized and coil of the solenoid 63 remains deenergized the valve spool will shift to its central or neutral position.

If the coil of solenoid 63 is energized (when coil of solenoid 62 is deenergized) the valve spool will be shifted to connect the valve pressure port 60 to the valve outlet port 53 so that pressurized fluid flows through line 52 to the upper port 56 of the cylinder 35 to thereby drive the sleeve 36 upwardly and in turn swing the rocker arm 19 to raise the abrasive cutoff disc 24. In this position of the valve spool, fluid will be forced out of the lower port 59 of the cylinder, and will flow through line 57 to the fluid return port 61 of the valve, and back to the reservoir 67. The flow control valve 55 is effective to control fluid flow in either direction in the line 52 so it will control the rate of movement of the abrasive cutoff disc in both its up and down movements.

A limit switch 70 is connected to and extends downwardly from the crosswall 45 of the rocker arm 19, the switch having a roller 71 at the end of its operating plunger, and this switch may be of a commercially available type. A block 72 is secured to and extends upwardly from the supporting surface 16 and has an opening to threadedly receive a stud extending downwardly from a head 73. The head is disposed in line with the roller 71 of the limit switch 70. By threading the stud inwardly or outwardly of the opening in the block 72, the head 73 may be positioned to engage the roller 71 and trip the limit switch at a selected downward position of the rocker arm 19.

Figure 7:
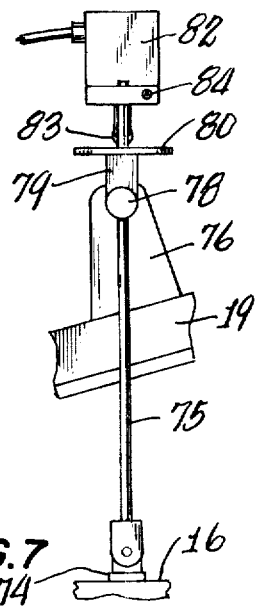
FIG. 7 is an enlarged, fragmentary view of certain parts.
Figure 8:
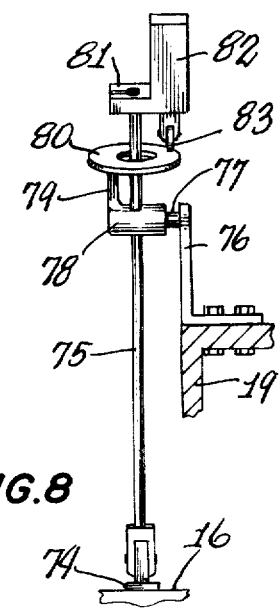
FIG. 8 is a view looking from the right of FIG. 7.

A bracket 74 is secured to and extends upwardly from the supporting surface 16 and pivotally connects to the bifurcated lower end of an upright rod 75. As best seen in FIGS. 7 and 8, an angle bracket 76 is bolted to the rocker arm 19. A pin 77 extends outwardly from the vertical leg of the bracket and is connected to a lug 78 which has a vertically-oriented hole through it to slidably pass the upright rod 75. A strut 79 is welded to the lug and to a ring 80 which has a center hole to freely pass the rod 75.

Mounted on the upper free end of the rod 75, by means of a split clamp 81, is a limit switch 82 of conventional construction. The plunger of the switch has a roller 83 which is adapted to be engaged by the ring 80 to trip the switch contacts. A set screw 84 is provided to tighten the split clamp 81 so that the limit switch 80 may be adjusted axially of the rod to a selected position. The ring abutment 80 insures that the roller 83 will be contacted even if the limit switch is rotated about the axis of the rod 75 from the position shown during vertical adjustment of the limit switch.

Figure 2:
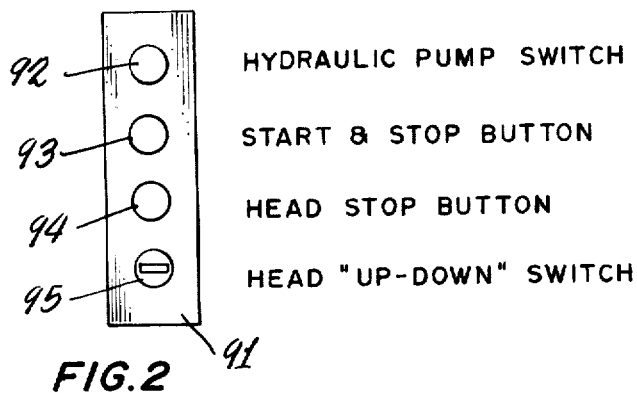
FIG. 2 is a front view of a control box shown in FIG. 1.

As seen in FIGS. 1 and 2, the housing 15 has an upright side housing 90 and a switch casing 91 is secured to an upper front portion of the side housing. The casing supports four switches 92, 93, 94 and 95. The switch 92 is an ordinary push-pull switch (see also FIG. 10) which is adapted to control energization of an electric motor 96 which is connected across lines L1 and L2 of a normal 115-volt source of electrical energy. The motor 96 drives the pump 65 to provide pressurized fluid for the hydraulic system.

The switch 93 is also an ordinary push-pull switch which is adapted to control energization of the electric motor 20, the latter, when energized, effecting high speed rotation of the abrasive cutoff disc. The switch 94 is also a push-pull switch having contactors 94a and 94b cooperable with contacts in two lines. The switch 95 is movable to two positions on opposite sides of a neutral position. In one of the two positions a contact 95a bridges contacts in one line, and in another of the two positions a contactor 95b bridges contacts in another line.

Figure 10:
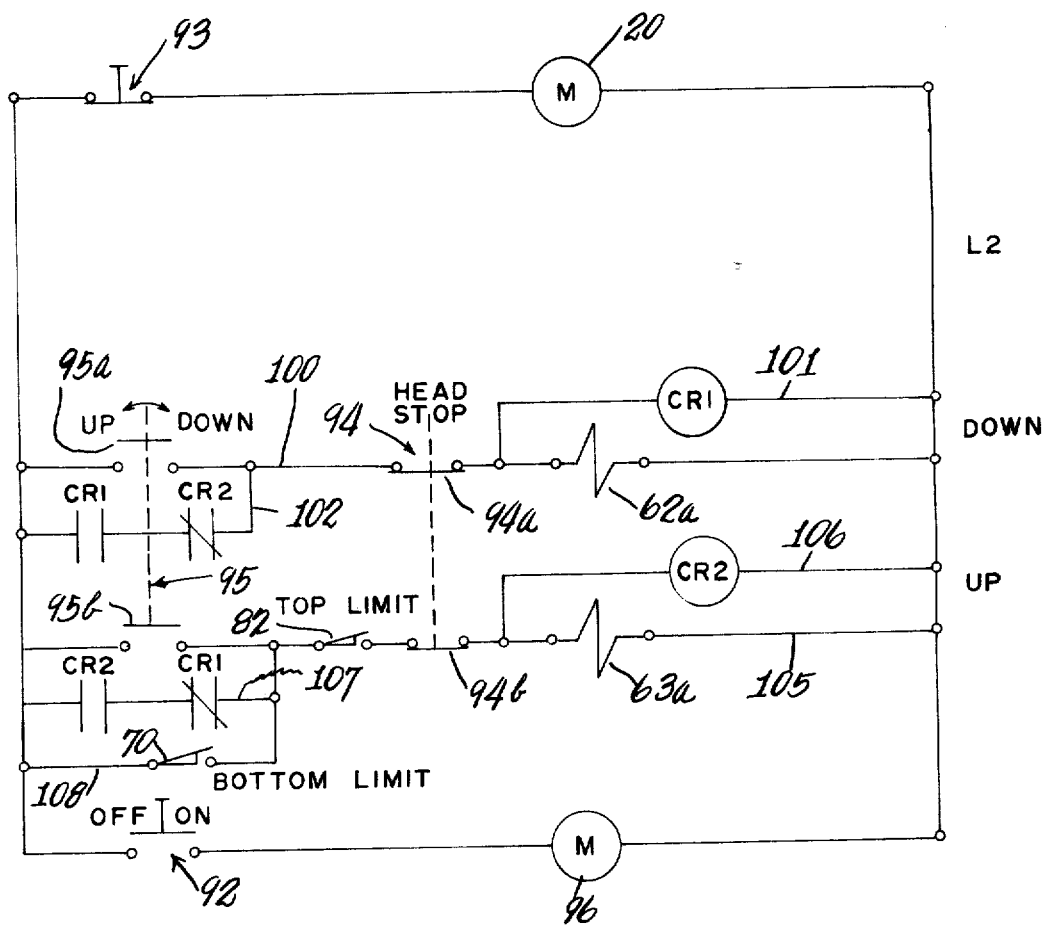
FIG. 10 is a diagrammatic view of the electrical circuit for controlling operation of the various electrical parts of the machine.

As seen in FIG. 10 a control line 100 extends across the supply lines L1 and L2. Interposed in the line 100 are contacts adapted to be bridged by the contactor 95a, and contacts which are bridged by the contactor 94a of switch 94. Also interposed in the line 100 is the coil 62a of valve solenoid 62. A line 101 is in parallel around the coil 62a and a relay CR1 is interposed in this line. A line 102 is in parallel around the contacts to be bridged by contactor 95a and normally open contacts CR1 and normally closed contacts CR2 are interposed in series in the line 102.

If the switch 95 is operated to cause the contactor 95a to bridge its contacts, electrical current will flow through the line 100 to energize solenoid coil 62a to shift the valve spool and cause shifting of the rocker arm to move the abrasive cutoff disc in a downward direction. The relay coil CR1 will also be energized to close contacts CR1 and thus provide a holding circuit around the contactor 95a which may then be released to its open position. If for any reason the operator wants to stop downward movement, he merely pushes switch 94 so that contactor 94a will open the line 100 and thus deenergize solenoid coil 62a and relay CR1. As before mentioned, the valve spool is moved to its two positions by solenoid action so that when the solenoid coil 62a is deenergized, the valve spool will shift to its central position. Deenergization of relay CR1 will again open relay contact CR1.

Another control line 105 extends across supply lines L1 and L2. Interposed in the line 105 are contacts adapted to be bridged by contactor 95b of switch 95, and contacts which are bridged by the contactor 94b of switch 94. Also interposed in the line 105 is the coil 63a of valve solenoid 63. A line 106 is in parallel around the coil 63a and a relay CR2 is interposed in this line. A line 107 is in parallel around the contacts to be bridged by contactor 95b of switch 95, and normally open contacts CR2 and normally closed contacts CR1 are interposed in series in the line 107. In parallel with line 107 is another line 108 in which is interposed the bottom limit switch 70. Top limit switch 82 is interposed in line 105.

With top limit switch 82 closed and the switch 95 moved so that its contactor 95b bridges its contacts, electrical current will flow through line 105 to energize coil 63a of valve solenoid 63 to positively shift the valve spool to cause shifting of the rocker arm 19 to move the abrasive cutoff disc in an upward position. The relay coil CR2 will also be energized to close relay contacts CR2 and thus provide a holding circuit around the contactor which may then be released to its open position. If for any reason the operator wants to stop upward movement, he merely pushes switch 94 so that contactor 94b will open the line 105 and thus deenergize solenoid coil 63a and relay CR2. Deenergization of relay CR2 will again open relay contacts CR2.

Upward movement will continue until the ring 80 engages the roller 83 of limit switch 82, whereupon the contacts of this limit switch will be opened to interrupt flow of current through line 105, and the solenoid coil 63a will be deenergized. Since the valve spool shifts to central position, the disc will remain in its uppermost position until the switch 95 is operated to cause its contactor 95a to bridge its contacts. In the downward phase of the abrasive disc, the contacts of top limit switch 82 will again close as soon as the ring 80 breaks its contact with roller 83. Downward movement will continue until the roller 71 of bottom limit switch 70 engages the stationary head 73, whereupon the contacts of lower limit switch are closed to close the circuit through lines 105 and 106. This causes energization of solenoid coil 63a to shift the valve spool in a direction to move the abrasive disc upwardly. Also, relay CR2 will be energized to open relay contacts CR2 in line 102 and close relay contacts CR2 in line 107. Thus, the abrasive disc moves from its upper position downwardly to cut through the work and then is automatically reversed to move back to its upper position.

The diameter of the abrasive disc and the tranverse size of the work to be cut largely dictate the adjustments for up-and-down limits. To make the desired adjustments the switch 92 is closed to start operation of the motor 96 for the hydraulic system. Assuming that the abrasive disc is in an upper position, the switch 95 is actuated so that its contactor 95a bridges its contacts. This will cause the disc to move downwardly and during this initial movement it is preferred to adjust the flow control valve 55 so that the disc moves down slowly.

When the periphery of the abrasive disc reaches about 1/16 inch (about 1.587 millimeters) from the bottom wall 31 of the vise 25, the stop switch 94 is quickly activated to stop farther downward movement of the abrasive disc. The bottom limit head 73 is now adjusted until it strikes the limit switch roller 71 and closes the contacts of the limit switch 70. Since the contacts of the upper limit switch are normally closed, the abrasive disc will be elevated. Upward movement of the disc could also be effected by activating the head up-down switch 95 to close contacts 95b.

After a predetermined amount of upward travel of the disc, the ring 80 will engage the roller 83 of the upper limit switch 82 and open the switch contacts to deenergize the coil 63a of the solenoid 63 and the valve spool will shift to neutral position and thereby stop and hold the abrasive disc in upward position. If the limit switch 82 is not adjusted properly on the rod 75, the fluid cylinder 35 could bottom out before the limit switch 80 is activated and the valve spool will not shift to neutral position and the abrasive disc will not come down on the next cycle when the contacts 95a of the up-down switch 95 are closed.

After the transverse size of the work to be cut has been determined, the limit switch 82 may be adjusted on the rod 75 so that the periphery of the abrasive disc 24 just clears the upwardly-directed surface of the work which is clamped in the vise. This adjustment should be changed as the abrasive disc wears to a smaller diameter or when the work changes in transverse size. After the foregoing adjustments have been made, the flow control valve 55 is adjusted to regulate the speed of the up-and-down movement of the abrasive disc to conform to selected cutting speeds.

I claim:

1. Apparatus for severing work, comprising a housing having a supporting surface, a rocker arm pivotally mounted intermediate to its ends on said supporting surface for rocking movement in a vertical direction, a motor supported on one arm of said rocker arm and a disc-like cutter rotatably mounted on the other arm of said rocker arm and having connection with said motor so as to be rapidly rotated thereby, a vise for clamping the work in position whereby said cutter engages and cuts through the work in its downward movement and is returnable to an upward position to permit said work to be shifted, the improvement comprising:

a fluid cylinder for effecting rocking action of said rocker arm and consequent up-and-down movement of said cutter, a solenoid valve for controlling flow of fluid under pressure to said cylinder, a limit switch mounted on the upper portion of an upright rod and adjustable to various positions axially therealong, said limit switch having an operating member, the lower end of said rod being pivotally connected to said housing supporting surface, said upper portion of said upright rod extending freely through the central opening of a disc-like ring which is connected to and movable with said rocker arm other arm, said disc-like ring engaging said limit switch operating member at a selectable upper position of said rocker arm other arm, said limit switch and the solenoid of said valve being included in an electrical circuit whereby said valve controls flow of fluid to said cylinder in a manner to interrupt upward movement of said cutter when said limit switch operating member is engaged by said disc-like ring.

* * * * *